Dec. 11, 1962

B. I. ULINSKI 3,068,021

ADJUSTABLE PIVOT FOR AXLE

Filed April 21, 1960

INVENTOR.
B. I. ULINSKI

BY A. H. Golden

ATTORNEY

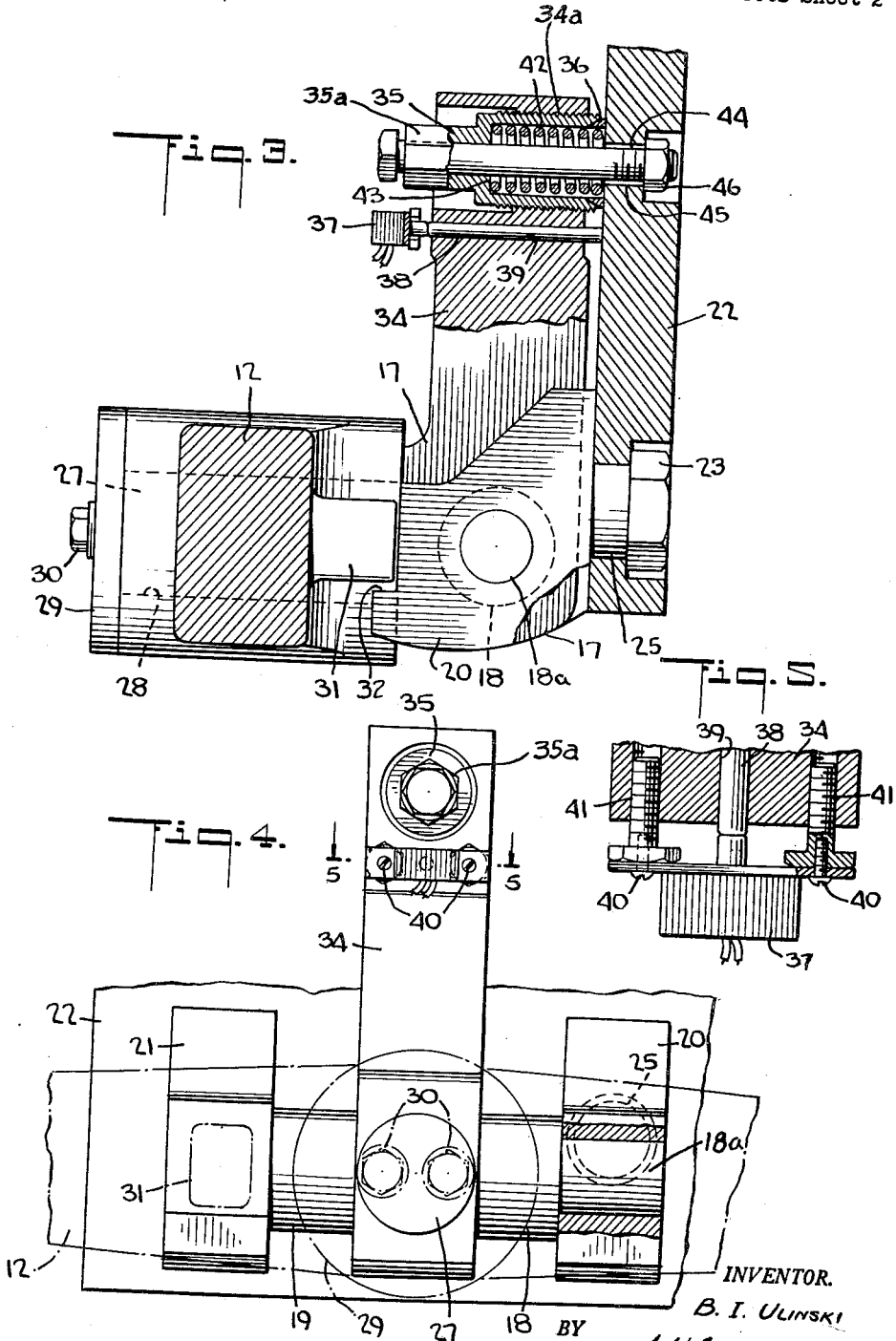

United States Patent Office 3,068,021
Patented Dec. 11, 1962

3,068,021
ADJUSTABLE PIVOT FOR AXLE
Bronislaus I. Ulinski, Flossmoor, Ill., assignor to The Yale & Towne Manufacturing Company, Stamford, Conn., a corporation of Connecticut
Filed Apr. 21, 1960, Ser. No. 23,725
12 Claims. (Cl. 280—111)

This invention relates to an industrial truck. More particularly, the invention relates to the mounting of the axle which carries the steerable wheels of such a truck.

The steerable wheels of an industrial truck are commonly mounted on spindles which are in turn pivotally secured to the ends of the axle by vertically extending pins, commonly referred to as king pins. The steering of the truck is effected by pivoting the wheel spindles and wheels about the king pins.

If the king pins are not truly vertical in the fore and aft direction of the truck, the steering effort necessary to steer the wheels is greatly increased. This is due to the fact that when the king pins are inclined in a fore and aft direction there msut be an actual lifting of the truck by the wheels as they are steered.

It is, however, difficult to mount the axle on the truck frame so that the king pins are truly vertical. This is particularly true in the case where the axle is pivotally mounted on a longitudinally extending pivot so that it may rock transversely of the truck. Such a pivot is commonly welded to the truck frame, and it is therefore difficult to accurately orient the pivot relatively to the truck frame so that the king pins of the axle are vertical. Furthermore, the bearing opening of the axle in which the pivot is received may not be properly oriented relatively to the king pins so that even if the pivot is correctly oriented relatively to the truck frame, the king pins will still not be vertical.

The present invention provides a very simple but extremely effective mounting for the axle whereby the axle may be quickly and easily adjusted as necessary to bring the king pins to a vertical position after the axle and wheels have been mounted on the truck. In addition, the mounting of the invention may also be used as a part of an overload detecting system to detect when excessive tipping moment has been applied to the truck tending to lift the steerable wheels off the ground.

In accordance with the invention, the mounting includes a support to which the axle is secured. The support in turn is pivotally secured to the frame of the truck for pivotal movement about an axis extending transversely of the truck, and adjusting means are provided extending between the support and the frame to pivot the support, and therefore the axle, as necessary to bring the king pins to a vertical position. In a preferred form of the invention, the support includes a pivot member on which the axle may rock transversely of the truck.

As a feature of the invention, the adjusting means pivot the support in only one direction relatively to the truck frame, and the weight of the truck holds the support in an adjusted position as determined by the adjusting means. If excessive tipping moment is applied to the truck tending to lift the steerable wheels from the ground, the force holding the support in adjusted position is relieved so that the support and axle may pivot away from the adjusted position relatively to the truck frame as the frame is lifted. This pivotal movement may be used to actuate suitable detecting means for indicating that excessive tipping moment has been applied to the truck. While the weight of the axle is normally sufficient to cause the support to pivot away from the adjusted position when excessive tipping moment is applied to the truck, a resilient spring is preferably provided to insure such a pivotal movement of the support.

The invention and its advantages having been broadly described, a more detailed description of one embodiment of the invention is given hereafter by reference to the accompanying drawings, wherein:

FIG. 3 is a sectional view taken on the line 3—3 of FIG. 2.

FIG. 4 is an enlarged elevational view of the axle mounting of the invention, and FIG. 5 is a sectional view taken on the line 5—5 of FIG. 4, to show the mounting of a limit switch used as a part of the overload detecting system.

Figures 1, 2:
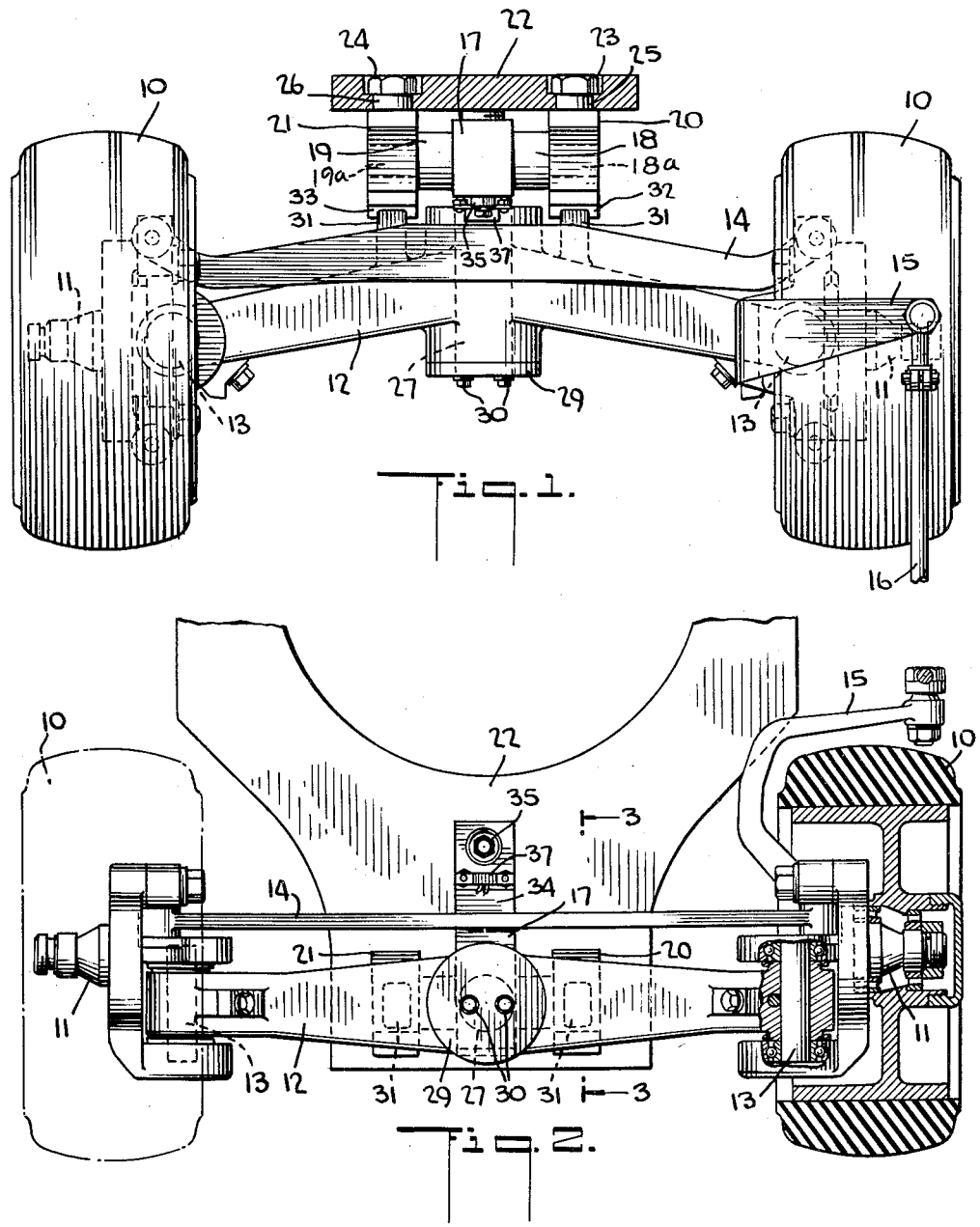
FIG. 1 is a plan view showing the steerable wheels and axle of an industrial truck mounted on the frame of the truck in accordance with the invention.
FIG. 2 is an elevational view, partly in section, of the axle, wheels and mounting as shown in FIG. 1.

Referring to the drawings, and in particular to FIGS. 1 and 2, the invention is shown in connection with a truck incorporating a steering system as described in U.S. Patent No. 2,829,903, issued to B. I. Ulinski. While the invention will be described hereafter in connection with a truck incorporating such a steering system, it will be appreciated that this is for the purpose of illustration and that the invention is also applicable to trucks incorporating other types of steering systems in which the steerable wheels are also pivotally mounted for steering movement on king pins carried by an axle.

As shown in FIGS. 1 and 2, a pair of steerable wheels 10 are rotatably mounted on wheel spindles 11, and the wheel spindles 11 are in turn pivotally secured to the opposite ends of a transversely extending axle 12 by means of vertical king pins 13. Steering of the truck is effected by pivotal movement of the spindles 11 and wheels 10 abount the king pins 13.

The spindles 11 are connected together for simultaneous steering movement by means of a tie rod 14, and the spindles are adapted to be pivoted by means of a steering arm 15 connected to one of the spindles. Steering arm 15 is in turn adapted to be moved in response to movement of a steering wheel (not shown) which is connected to the arm 15 through a suitable linkage, including a link 16.

It will be appreciated that if the king pins 13 are not truly vertical in the fore and aft, or longitudinal, direction of the truck, that the weight of the truck must be lifted by the wheels in order for the wheels 10 to be turned in one direction or the other. Inasmuch as an industrial truck is quite heavy, it can be appreciated that having to lift the truck by the steering wheels results in a substantial increase in the effort that must be exerted to steer the truck. The present invention, however, permits the king pins 13 to be quickly and easily adjusted to bring them into a truly vertical position so that the truck does not have to be lifted by the wheels during steering.

In accordance with the invention, a novel mounting is provided for the axle 12 which permits the axle to be pivoted about an axis extending transversely of the truck so that the axle may be adjusted as necessary to bring the king pins 13 into a truly vertical position relatively to the longitudinal direction of the truck. As best shown in FIGS. 1, 3 and 4, the novel mounting includes a support 17 which is mounted for pivotal movement about an axis extending transversely of the truck by means of integral shaft portions 18 and 19 having reduced end portions 18a and 19a which are journaled in openings provided in a pair of spaced brackets 20 and 21. Brackets 20 and 21 are secured to a transverse frame member 22 of the truck by means of nuts 23 and 24 which are threaded on to the ends of stud members 25 and 26. Stud members 25 and 26 are formed integrally with the brackets 20 and 21 and extend through suitable holes provided in the frame member 22.

The support 17 includes an integral pivot member or pin 27 which extends perpendicularly to the shaft portions 18 and 19, and the axle 12 is mounted for transverse rocking movement on the pivot member 27 to allow the axle to adjust to any unevenness in the floor or ground on which the truck is operated. The pivot member 27 is received in a bearing opening 28 in the axle 12 and the axle is held on the pivot member 27 by means of a retainer plate 29 which is secured to the end of the pivot member 27 by bolts 30. Excessive rocking of the axle 12 is prevented by engagement of integral lugs 31 formed on the axle with shoulders 32 and 33 formed on brackets 20 and 21, respectively.

The support 17 has an upwardly extending arm 34 and, as best shown in FIG. 3, a hollow adjusting screw 35 is threaded at 34a to the arm 34. The inner end of the screw 35 carries a self-adjusting bearing pad 36 which is adapted to engage and adjust to the surface of the transverse frame member 22. The pad 36 is normally held in contact with the surface of the frame member 22 by the weight of the truck and load on the wheels 10. The screw 35 has a hexagonal head portion 35a by which it may be readily turned by a suitable tool. It will be appreciated that by turning the adjusting screw 35, the arm 34 may be quickly and easily moved away from the frame 22 against the weight of the truck to pivot the support 17 and the axle 12 as necessary to bring the king pins 13 into a vertical position. During normal operation of the truck the weight of the truck and load holds the support 17, axle 12 and king pins 13 in the adjusted position as determined by the adjusting screw 35.

In lift trucks, the steerable wheels are commonly mounted at the rear of the truck with the lifting forks of the truck extending from the front of the truck. Accordingly, the application of a load to the forks results in a moment being applied to the truck tending to tip the truck about its front axle. If this tipping moment is excessive the rear wheels of the truck may actually be lifted from the ground with consequent danger of dropping of the load, or injury to the operator or truck. It is, therefore, desirable that some type of detecting arrangement be provided, to indicate when excessive moment has been applied to the truck. The axle mounting of the present invention is ideally suited for use in such a system. When excessive tipping moment is applied to a truck incorporating the axle mounting of the invention, the support member 17 pivots counterclockwise relatively to the frame 22 as the frame 22 is lifted. In accordance with a feature of the invention this pivotal movement of the support member 17 is used to actuate a suitable control member to indicate that an excessive moment has been applied to the truck.

As best shown in FIGS. 3 and 5, the control member may be a simple limit switch as indicated at 37. The limit switch 37 is adjustably secured to the arm 34, and during operation of the truck under normal load the limit switch 37 is held pressed by a nylon plunger 38 which extends through a bore 39 in the arm 34 with one end contacting the button of the switch 37 and the other end contacting the surface of the frame 22.

When, however, the frame 22 is lifted relatively to the wheels 10 and axle 12, as may occur when excessive tipping moment is applied to the truck, the arm 34 will pivot away from the frame 22 so that the limit switch 37 is released. The limit switch 37 when released may be used to complete an electrical circuit to a suitable horn or light, or may be used in an appropriate electrical control circuit to stop movement of the truck or lifting of a load by the load carriage of the truck so as to indicate that excessive tipping moment has been applied to the truck.

As shown in FIG. 5, the limit switch 37 is conveniently secured by means of a pair of screws 40 to the heads of a pair of adjusting screws 41 which are threaded into the arm 34. It will be appreciated that by proper adjustment of the adjusting screws 41, the position of the limit switch 37 may be adjusted so that it is pressed when the arm 34 is in a particular adjusted position with the pad 36 pressing against the frame 22, and so that the limit switch 37 will be released when the arm 34 moves away from the frame 22 a predetermined amount as the frame 22 is lifted relative to the wheels and axle.

While the arm 34 would normally pivot away from the frame 22 under the weight of the axle 12 and wheels 10 when the frame is lifted by excessive tipping moment, a compression spring 42 is preferably provided to urge the arm 34 and frame 22 apart under such a condition. The compression spring 42 is conveniently carried in the hollow adjusting screw 35 with one end thereof bearing against an internal shoulder 43 of the screw 35 and the other end of the spring bearing against the frame 22 so as to urge the arm 34 away from the frame 22. The strength of the spring 42 is such that under the weight of the truck and a normal load, the spring 42 will be compressed so that the pad 36 of the screw 35 bears against the frame 22. If, however, the load of the truck is increased so that the tipping moment approaches the safe upper limit, the load on the spring 42 will be decreased and the spring will urge the arm 34 away from the frame 22 so that the limit switch 37 is released. Spring 42 therefore prevents sticking of the support 17 so as to insure release of the limit switch 37.

The axle mounting of the invention including the spring 37 may be conveniently applied to the trucks without the limit switch 33 and plunger 34, and the limit switch and plunger may then be added by the purchasers of the trucks at any later time if such is desired.

As best shown in FIG. 3, excessive pivotal movement of the support 17 is prevented by a bolt 44 which extends through the adjusting screw 35 and through a hole 45 provided through the frame 22 and has a nut 46 threaded on its ends. After the support 17 has been properly adjusted by turning of the adjusting screw 35 to bring the king pins 13 into a truly vertical position, the bolt 43 may be adjusted to allow just enough pivotal movement of the support 17 to insure proper operation of the limit switch 37.

From the preceding description it can be seen that there is provided a novel mounting for the axle of the steering wheels of an industrial truck which permits the axle to be easily and quickly adjusted to bring the king pins into a truly vertical position, so as to insure minimum steering effort. In addition, the mounting may also be used with very little modification as a part of an overload detecting system. While one embodiment of the invention has been shown and described, it will be appreciated that this is for the purpose of illustration and that modifications and changes may be made therein without departing from the spirit and scope of the invention.

I claim:

1. In an industrial truck, a truck frame, an axle extending transversely of said truck, steerable wheels pivotally secured by means of king pins to each end of said axle, pivot means fixed to said truck frame mounting said axle on said frame for pivotal movement about an axis which extends transversely of said truck and which is fixed with respect to said truck frame, whereby said axle may be adjusted by pivoting thereof about said transversely extending axis to bring said king pins into a vertical position relatively to the longitudinal direction of the truck, and means operable to pivot said axle about said transversely extending axis to bring said king pins into a vertical position and to rigidly hold said king pins in said vertical position against the weight of the truck.

2. In an industrial truck, a frame, an axle extending transversely of said truck, steerable wheels pivotally secured by means of king pins to each end of said axle, a support, a pivot member on said support, means mounting said axle on said pivot member for rocking movement about an axis extending longitudinally of the truck, pivot means fixed to said truck frame mounting said support on said frame for pivotal movement about an axis which extends transversely of said truck and which is fixed with respect to said truck frame, whereby said support and said axle mounted thereon may be adjusted by pivotal movement thereof about said transversely extending axis to bring said king pins into a vertical direction relatively to the longitudinal direction of the truck, and means operable to pivot said support and said axle about said transversely extending axis to bring said king pins into a vertical position and to rigidly hold said king pins in said vertical position against the weight of the truck.

3. In an industrial truck, a truck frame, an axle extending transversely of said truck, steerable wheels pivotally secured by means of king pins to each end of said axle, pivot means fixed to said truck frame mounting said axle on said frame for pivotal movement about an axis which extends transversely of said truck and which is fixed with respect to said truck frame, whereby said axle may be adjusted by pivotal movement about said transversely extending axis to bring said king pins into a vertical position relatively to the longitudinal direction of the truck, and means for pivoting said axle downwardly relatively to said frame to bring said king pins into a vertical position and to rigidly hold said king pins in said vertical position against the weight of the truck.

4. In an industrial truck, a truck frame, an axle extending transversely of said truck, steerable wheels pivotally secured by means of king pins to each end of said axle, a suport, a pivot member on said support, means mounting said axle on said pivot member for rocking movement about an axis extending longitudinally of the truck, pivot means fixed to said truck frame mounting said support on said frame for pivotal movement about an axis which extends transversely of said truck and which is fixed with respect to said truck frame, whereby said support and axle may be adjusted by pivotal movement about said transversely extending axis to bring said king pins into a vertical position relatively to the longitudinal direction of the truck, and means for pivoting said support and axle downwardly relatively to said frame to bring said king pins into a vertical position and rigidly hold said king pins in said vertical position against the weight of the truck.

5. In an industrial truck, a truck frame, an axle extending transversely of said truck, steerable wheels pivotally secured by means of king pins to each end of said axle, means mounting said axle on said frame for pivotal movement about an axis extending transversely of said truck whereby said axle may be adjusted by pivotal movement about said transversely extending axis to bring said king pins into a vertical position relatively to the longitudinal direction of the truck, means for pivoting said axle downwardly relatively to said frame to bring said king pins into a vertical position and to hold said axle in a downwardly pivoted position against the weight of the truck while permitting further downward movement of said axle relatively to said frame upon lifting of said frame from a predetermined position, and control means operable in response to said further downward movement for indicating when said frame has been lifted a predetermined amount.

6. In an industrial truck, a truck frame, an axle extending transversely of said truck, steerable wheels pivotally secured by means of king pins to each end of said axle, a support, a pivot member on said support, means mounting said axle on said pivot member for rocking movement about an axis extending longitudinally of the truck, means mounting said support on said frame for pivotal movement about an axis extending transversely of said truck whereby said support and axle may be adjusted by pivotal movement about said transverse axis to bring said king pins into a vertical position relatively to the longitudinal direction of the truck, means for pivoting said axle downwardly relatively to said frame to bring said king pins into a vertical position and to hold said axle in a downwardly adjusted position against the weight of the truck while permitting further downward movement of said axle relatively to said frame upon lifting of said frame from a predetermined position, and control means operable in response to said further downward movement for indicating when said frame has been lifted a predetermined amount.

7. In an industrial truck, a truck frame, an axle extending transversely of said truck, steerable wheels pivotally secured by means of king pins to each end of said axle, means mounting said axle on said frame for pivotal movement about an axis extending transversely of said truck whereby said axle may be adjusted by pivotal movement about said transverse axis to bring said king pins into a vertical position relatively to the longitudinal direction of the truck, means for pivoting said axle downwardly relatively to said frame to bring said king pins into a vertical position and to hold said axle in a downwardly pivoted position against the weight of the truck while permitting further downward movement of said axle relatively to said frame upon lifting of said frame from a predetermined position, a resilient spring member for urging said axle toward a downward position relatively to said frame when said frame is lifted, and control means operable in response to said further downward movement for indicating when said frame has been lifted a predetermined amount.

8. In an industrial truck, a truck frame, an axle extending transversely of said truck, steerable wheels pivotally secured by means of king pins to each end of said axle, a support, a pivot member on said support, means mounting said axle on said pivot member for rocking movement about an axis extending longitudinally of the truck, means mounting said support on said frame for pivotal movement about an axis extending transversely of said truck whereby said support and axle may be adjusted by pivotal movement about said transversely extending axis to bring said king pins into a vertical position relatively to the longitudinal direction of the truck, means for pivoting said support and said axle downwardly relatively to said frame to bring said king pins into said vertical position and to hold said axle in a downwardly adjusted position against the weight of the truck while permitting further downward movement of said support and axle relatively to said frame upon lifting of said frame from a predetermined position, a resilient spring interposed between said support and said frame for urging said support and axle toward a downward position relatively to said frame when said frame is lifted, and control means operable in response to said further downward movement for indicating when said frame has been lifted a predetermined amount.

9. In an industrial truck, a truck frame, an axle extending transversely of said truck, steerable wheels pivotally secured by means of king pins to each end of said axle, a support attached to said axle, pivot means fixed to said truck frame mounting said support on said frame for pivotal movement about an axis which extends transversely of said truck and which is fixed with respect to said truck frame, whereby said axle may be adjusted by pivotal movement about said transversely extending axis to bring said king pins into a vertical position relatively to the longitudinal direction of said truck, said support having an arm extending from said transversely extending axis, and an adjusting screw extending between said arm and said frame for pivoting said support and axle relatively to said frame to bring said king pins into a vertical position and hold said king pins in said vertical position.

10. In an industrial truck, a truck frame, an axle extending transversely of said truck, steerable wheels pivotally secured by means of king pins to each end of said axle, a support, said support having a longitudinally extending pivot member, means mounting said axle on said pivot member for transverse rocking movement about an axis extending longitudinally of the truck, pivot means fixed to said truck frame mounting said support on said frame for pivotal movement about an axis which extends transversely of said truck and which is fixed with respect to said truck frame, whereby said support and axle may be adjusted by pivotal movement about said transversely extending axis to bring said king pins into a vertical position relatively to the longitudinal direction of the truck, said support having an arm extending from said transversely extending axis, and an adjusting screw extending between said frame and said arm for pivoting said support and axle relatively to said frame to bring said king pins into a vertical position and hold said king pins in said vertical position.

11. In an industrial truck, a truck frame, an axle extending transversely of said truck, steerable wheels pivotally secured by means of king pins to each end of said axle, a support, said support having a longitudinally extending pivot member, means mounting said axle on said pivot member for rocking movement about an axis extending longitudinally of said truck, pivot means fixed to said truck frame mounting said support on said frame for pivotal movement about an axis which extends transversely of said truck and which is fixed with respect to said truck frame, whereby said support and axle may be adjusted by pivotal movement about said transversely extending axis to bring said king pins into a vertical position relatively to the longitudinal direction of the truck, said support having an arm extending from said transversely extending axis, and an adjusting screw threaded through said arm and bearing against said frame for pivoting said support and axle relatively to said frame to bring said king pins into a vertical position and hold said king pins in said vertical position.

12. In an industrial truck, a truck frame, an axle extending transversely of said truck, steerable wheels pivotally secured by means of king pins to each end of said axle, a support, said support having a longitudinally extending pivot member, means mounting said axle on said pivot member for rocking movement about an axis extending longitudinally of said truck, means mounting said support on said frame for pivotal movement about an axis extending transversely of said truck whereby said support and axle may be adjusted by pivotal movement about said transversely extending axis to bring said king pins into a vertical position relatively to the longitudinal direction of the truck, said support having an arm extending from said transversely extending axis, an adjusting screw threaded through said arm and bearing against said frame for pivoting said arm away from said frame to bring said king pins into a vertical position and hold said king pins in said vertical position against the weight of the truck while allowing further movement of said arm relatively to said frame upon lifting of said frame, a limit switch secured to said arm, and switch actuating means engageable with said frame to normally actuate said switch and to release said switch upon said further movement of said arm to indicate when said frame has been lifted a predetermined amount.

References Cited in the file of this patent

UNITED STATES PATENTS

| 1,793,482 | Hendrickson | Feb. 24, 1931 |
| 1,955,968 | MacPherson | Apr. 24, 1934 |
| 2,674,463 | Peterson | Apr. 6, 1954 |
| 2,674,464 | Peterson | Apr. 6, 1954 |
| 2,819,909 | Calundan | Jan. 14, 1958 |
| 2,855,212 | Houser | Oct. 7, 1958 |